Oct. 6, 1970    C. H. SNYDER, JR    3,532,364
SWIVEL COUPLING

Filed Aug. 30, 1968    2 Sheets-Sheet 1

INVENTOR
CLIFFORD H. SNYDER, JR.
BY George Ruymovich
ATTORNEY

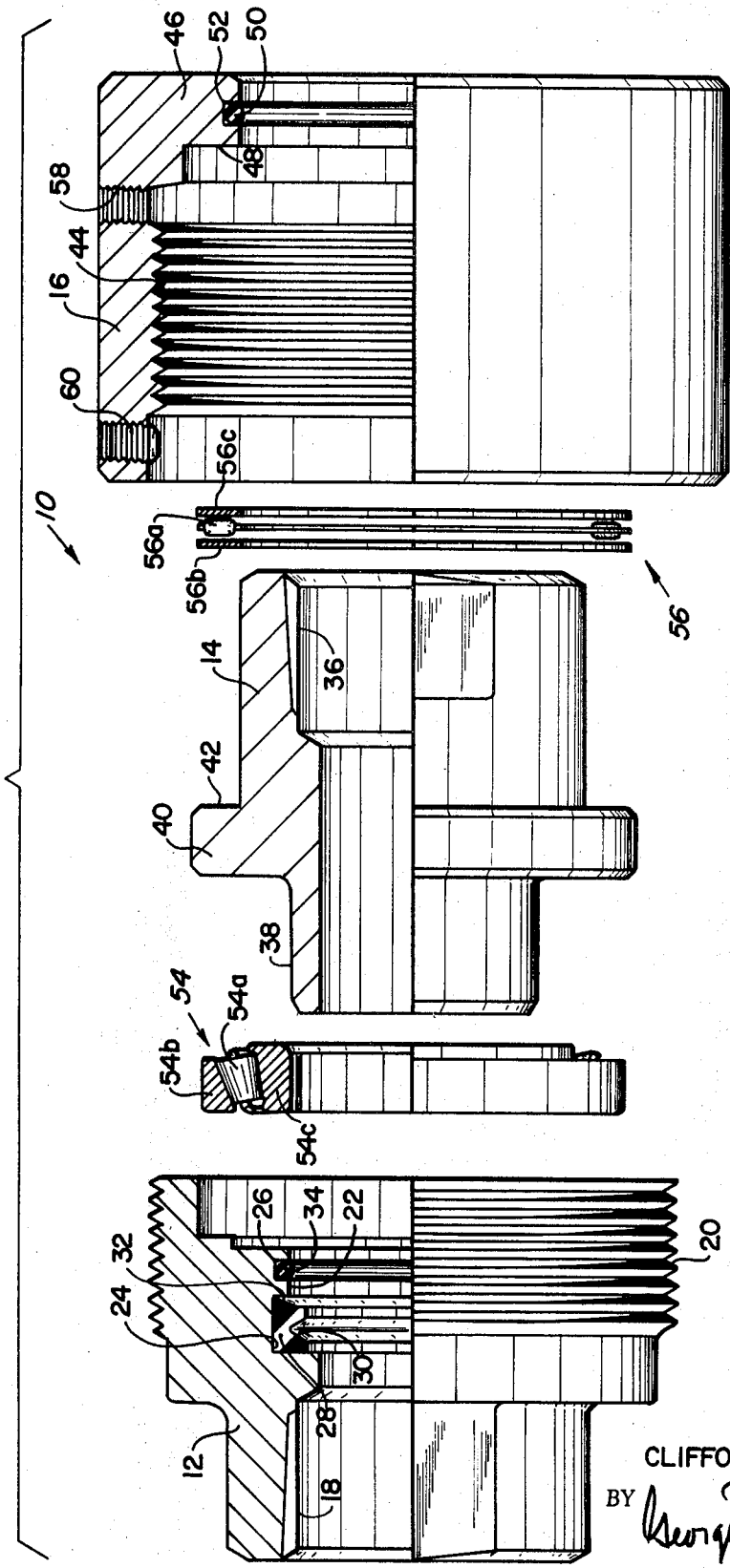

United States Patent Office 3,532,364
Patented Oct. 6, 1970

3,532,364
SWIVEL COUPLING
Clifford H. Snyder, Jr., 173 Rosemont Drive,
Coraopolis, Pa. 15108
Filed Aug. 30, 1968, Ser. No. 756,669
Int. Cl. F16l 17/00, 27/00
U.S. Cl. 285—98                                    2 Claims

ABSTRACT OF THE DISCLOSURE

A swivel coupling is provided in which a threaded collar joins the two coupling halves. Thrust bearings are positioned between the two coupling halves and between the collar and one coupling half so that after the coupling is threaded together the collar and one coupling half rotate as a unit relative to the other half. A piloting arrangement is provided between the two coupling halves to facilitate coupling and swiveling. A novel running seal arrangement is provided to seal the flow passages through the coupling.

BACKGROUND OF THE INVENTION

In many piping applications, swiveling of one conduit relative to another is necessary. The present invention is directed to a novel swiveling coupling in which very high pressure fluid may be conducted without reducing the effectiveness of the swivel. It has been found that many previously available swivel couplings operate well at low pressure, but bind and stick when the pressure within the coupling is greatly increased.

In addition to providing a bearing arrangement which permits ready swiveling of the coupling, the present invention provides a novel running seal arrangement which permits low friction between the two coupling halves and thereby promotes swiveling. The present invention also has bearings and seals which are readily accessible for easy replacement.

SUMMARY

The swivel coupling of the present invention has a heavy duty tapered roller bearing positioned between the two coupling halves to absorb the thrust between the coupling halves and to promote free swiveling. A needle roller bearing in positioned between the collar and one coupling half to take up the thrust between the collar and the coupling half when the collar is threaded onto the other coupling half to engage the coupling. A seal ring is provided which is retained in a radial groove in one coupling half. The seal ring is of generally rectangular cross section and has a V groove formed in the cylindrical internal surface. An axially extending flange on the seal ring abuts the end of the coupling half to provide an effective seal. Located in side by side relation to the seal ring is an O ring which sealingly engages the coupling half so that an effective running seal is provided by means of the seal ring and the O ring.

Another O ring seal is provided between the collar and one coupling half to provide a lubrication chamber for the thrust bearings of the present invention. A set screw is provided in the collar of the coupling so that after the collar is engaged to one coupling half by threading the collar over that coupling half, the collar may be locked in place by engaging the set screw to the outer coupling half.

With the foregoing considerations in mind, it is an object of the present invention to provide an improved swivel coupling.

Another object of the present invention is to provide a swivel coupling having thrust bearings therein to promote swiveling under high fluid pressure.

These and other objects of the present invention will become apparent as this description proceeds in conjunction with the accompanying drawing.

DESCRIPTION OF THE DRAWING

FIG. 2 shows the coupling in a disassembled condition.

DESCRIPTION OF THE PREFERRED EMBODIMENT

Figure 1:
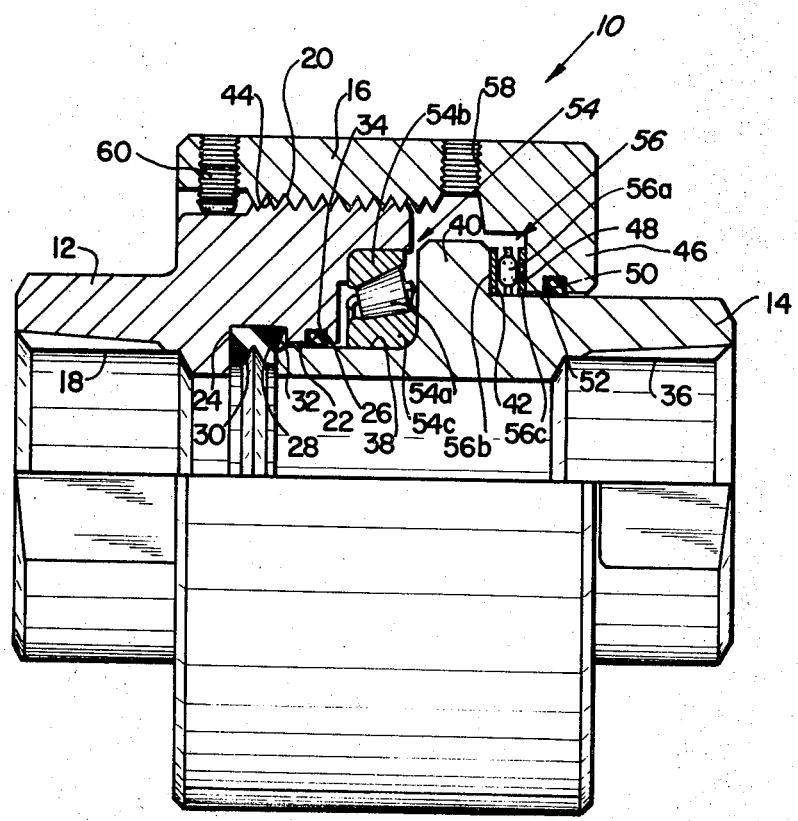
FIG. 1 shows a partial section of the coupling of the present invention in the engaged position.

Referring to the drawings, there is shown a swivel coupling 10 having a first coupling member 12, and a second coupling member 14, and a collar 16.

The first coupling member 12 has a flow passage 18 formed therethrough, an external threaded surface 20, and a smooth cylindrical internal surface 22. Formed within the cylindrical internal surface 22 are radial grooves 24 and 26.

Positioned within radial groove 24 is a seal ring 28 which is of generally rectangular cross section. The seal ring 28 has a V groove 30 formed on the cylindrical internal surface of the seal ring 28. The seal ring 28 also has an axially extending flange 32 which abuts the second coupling member 14 in a manner to be described.

Positioned in the radial groove 26 is an O ring 34 which also contacts the second coupling member 14 when the coupling is in the engaged position shown in FIG. 1. The second coupling member 14 has a flow passage 36 formed therethrough. and has a smooth cylindrical surface 38 formed thereon. The second coupling member 14 also has a radially extending shoulder 40 that has a smooth, flat, annular surface formed thereon. The cylindrical external surface 38 formed on second coupling member 14 pilots into, and is contiguous to, the cylindrical internal surface 22 formed on first coupling member 12.

The collar 16 has a threaded internal surface 44 which threadingly mates with the threaded external surface 20 of the first coupling member 12. The collar 16 also has a radially inwardly extending shoulder 46 which has a smooth, flat, annular surface 48 formed thereon. The annular surface 48 on the collar and the annular surface 42 on the second coupling member 14 have the same general radial dimensions so that they over-lie each other when the collar 16 is over the second coupling member 14.

The collar 16 also has an O ring 50 which is retained in a groove 52 formed in the collar. The O ring 50 sealingly engages the second coupling member 14 when the collar is in position on the member 14.

A thrust bearing 54 having tapered rollers 54a, a conical race 54b and a conical race 54c is positioned between the first coupling member 12 and the second coupling member 14. When the coupling is engaged and is swiveling, the conical race 54b rotates with first coupling member 12 and the conical race 54c rotates with the second coupling member 14.

A thrust bearing bearing 56 having a plurality of needle rollers 56a, a flat race 56b and a flat race 56c is positioned between the collar 16 and the second coupling member 14. When the coupling 10 swivels, the race 56b rotates with the second coupling member 14 and the race 56c rotates with the collar 16.

A lubrication port 58 is formed in collar 16 and a set screw 60 is threadingly received in the collar 16 to lock collar 16 to first coupling member 12 when the collar is threaded over the coupling member 12.

From the arrangement described above, it will be noted that there are thrust bearings connecting the first and second coupling members 12 and 14 and connecting the collar 16 and the second coupling member 14. It will be seen that when the collar 16 is threaded onto the first coupling member 12 and the set screw 60 is locked in place, the first coupling member 12 and collar 16 rotate as a unit over the second coupling member 14.

It may further be seen that when the coupling is disengaged by unthreading the collar 16 from the coupling member 12, the thrust bearings 54 and 56 may easily be removed from the coupling for replacement if necessary as shown in FIG. 2. Further, the seal ring 28 and the O rings 34 and 50 are accessible and may also be readily removed when the coupling is in the disengaged position.

When the coupling 10 is in the engaged position, as shown in FIG. 1, the second coupling member 14 abuts the seal ring 28 and the axially extending flange 32 of the seal ring 28 sealingly engages the second coupling member 14. Further, the V groove 30 of the seal ring 28 permits line fluid pressure to slightly expand the seal ring 28 axially and further enhance the sealing qualities under higher pressure. The O ring 34 serves the dual purpose of providing a seal between the fluid passages 18 and 36 of the first and second coupling members 12 and 14, respectively, and also provide seal means to keep lubricant in the bearings 54 and 56.

According to the provisions of the patent statute, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:
1. A swivel coupling comprising:
   (a) a first coupling member having
      (1) a flow passage therethrough;
      (2) a threaded external surface;
      (3) a cylindrical internal surface for receiving a second coupling member;
      (4) a pair of annular grooves formed in said internal surface and retaining respectively a first O ring seal and an enlarged seal ring gasket, said seal ring gasket abutting a radially inwardly extending shoulder that is an extension of one radial wall of said annular groove containing said seal ring gasket; and
      (5) an axially extending bearing receiving sleeve having an internal diameter greater than the diameter of said cylindrical internal surface to receive and support an outer race of a tapered roller bearing;
   (b) a second coupling member having
      (1) a flow passage therethrough;
      (2) a cylindrical external surface to be received contiguously within said first member cylindrical internal surface and in sealing contact with said first member O ring seal;
      (3) an annular end wall to be positioned in abutting relation with said seal ring gasket when said coupling is assembled whereby said seal ring gasket is subjected to an axial compressure force between said annular end wall and said first coupling member inwardly extending shoulder to form a seal between said first and second coupling members; and
      (4) a radially outwardly extending shoulder having an annular surface thereon;
   (c) a generally cylindrical collar having
      (1) a threaded internal surface to threadingly engage said first coupling member threaded external surface;
      (2) a radially inwardly extending shoulder having an annular surface thereon with radial dimensions similar to those of said second coupling member annular surface; said radially inwardly extending shoulder having an annular groove formed in the cylindrical internal surface thereof to receive a second O ring seal, and said internal surface being continuous to said second coupling member;
   (d) a tapered roller bearing having one race supported within said first coupling member bearing receiving sleeve and rotatable therewith and the other race supported on said second coupling member cylindrical external surface against said radially outwardly extending shoulder and rotatable therewith, and a plurality of interconnected tapered rollers positioned therebetween to facilitate rotation of said first coupling member relative to said second coupling member;
   (e) a needle roller bearing having one race in abutting relation to said second coupling member shoulder annular surface and rotatable therewith and the other race in abutting relation to said collar shoulder annular surface and rotatable therewith, and a plurality of interconnected needle rollers positioned therebetween to facilitate rotation of said collar relative to said second coupling member, the inside diameter of said tapered roller bearing being substantially smaller than the inside diameter of said needle roller bearing, said seal ring gasket providing an axial running seal between said first and second coupling members, said first O ring seal providing a radial running seal between said first and second coupling members, and said second O ring seal providing a radial running seal between said collar and said second coupling member so that said first coupling member and said collar may swivel as a unit relative to said second coupling member when said swivel coupling is engaged.

2. The swivel coupling of claim 1 wherein said seal ring gasket, said first O ring seal, said second O ring seal, said tapered roller bearing and said needle roller bearing are all readily removable and replaceable upon disengagement of said coupling.

References Cited
UNITED STATES PATENTS

| | | | |
|---|---|---|---|
| 1,695,019 | 12/1928 | McElroy | 285—281 X |
| 1,959,823 | 5/1934 | Greve | 285—281 |
| 2,486,451 | 11/1949 | Warren | 285—98 |
| 2,532,669 | 12/1950 | Jones | 285—278 X |
| 2,833,566 | 5/1958 | Meyer et al. | 285—280 X |
| 2,833,568 | 5/1958 | Corsette | 285—98 X |
| 3,148,897 | 9/1964 | Hurt et al. | 285—98 |
| 3,346,275 | 10/1967 | Des Jardins | 285—98 |

THOMAS F. CALLAGHAN, Primary Examiner

U.S. Cl. X.R.

285—351